(12) United States Patent
Scheuermann et al.

(10) Patent No.: US 7,225,279 B2
(45) Date of Patent: May 29, 2007

(54) DATA DISTRIBUTOR IN A COMPUTATION UNIT FORWARDING NETWORK DATA TO SELECT COMPONENTS IN RESPECTIVE COMMUNICATION METHOD TYPE

(75) Inventors: W. James Scheuermann, Saratoga, CA (US); Eugene B. Hogenauer, San Carlos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 192 days.

(21) Appl. No.: 10/443,554

(22) Filed: May 21, 2003

(65) Prior Publication Data
US 2004/0010645 A1   Jan. 15, 2004

Related U.S. Application Data

(60) Provisional application No. 60/391,874, filed on Jun. 25, 2002.

(51) Int. Cl.
*G06F 13/14* (2006.01)
(52) U.S. Cl. .......................... 710/33; 709/250
(58) Field of Classification Search ............... 710/38, 710/40; 712/28, 29
See application file for complete search history.

(56) References Cited

U.S. PATENT DOCUMENTS

| | | | | |
|---|---|---|---|---|
| 4,905,231 | A * | 2/1990 | Leung et al. | 370/400 |
| 5,796,957 | A * | 8/1998 | Yamamoto et al. | 709/251 |
| 6,119,178 | A * | 9/2000 | Martin et al. | 710/72 |
| 6,381,293 | B1 * | 4/2002 | Lee et al. | 375/377 |
| 6,859,434 | B2 * | 2/2005 | Segal et al. | 370/230 |

\* cited by examiner

*Primary Examiner*—Kenneth S. Kim
(74) *Attorney, Agent, or Firm*—Patterson & Sheridan, L.L.P.

(57) ABSTRACT

A data distributor in a computational unit of an integrated circuit is enclosed. The data distributor receives data from a network and distributes the data to a plurality of components within the computational unit. The data distributor includes an input mechanism for receiving the data from the network, and distributes the data to a selected component of the plurality of components, a control mechanism responsive to a control signal for distributing the data to the selected component using a data distribution selected between a look-up table-based memory write and a point-to-point distribution with acknowledgement. The plurality of components comprises a Peek/Poke Module, an Execution Unit, a DMA Engine, and a Hardware Task Manager Message Generator. The selected data distribution type may comprise using an output port number or a direct-memory address transfer or an interrupt to distribute the data.

29 Claims, 5 Drawing Sheets

DATA DISTRIBUTOR IN A COMPUTATION UNIT FORWARDING NETWORK DATA TO SELECT COMPONENTS IN RESPECTIVE COMMUNICATION METHOD TYPE

CLAIM OF PRIORITY

This application claims priority from U.S. Provisional Patent Application No. 60/391,874, filed on Jun. 25, 2002 entitled "DIGITAL PROCESSING ARCHITECTURE FOR AN ADAPTIVE COMPUTING MACHINE"; which is hereby incorporated by reference as if set forth in full in this document for all purposes.

CROSS-REFERENCE TO RELATED APPLICATIONS

This application is related to U.S. patent application Ser. No. 09/815,122, filed on Mar. 22, 2001, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS now issued U.S. Patent No. 6,836,839."

This application is also related to the following copending applications:

U.S. patent application Ser. No. 10/443,501, filed on May 21, 2003, entitled, "HARDWARE TASK MANAGER FOR ADAPTIVE COMPUTING" ; and U.S. patent application Ser. No.10/443,596, filed on May 21, 2003, entitled, "HARDWARE TASK MANAGER FOR ADAPTIVE COMPUTING".

BACKGROUND OF THE INVENTION

This invention relates in general to digital data processing and more specifically to a uniform interface for transferring digital information to and from a computational unit in an adaptive computing engine (ACE) architecture.

A common limitation to processing performance in a digital system is the efficiency and speed of transferring data and other information among different components and subsystems within the digital system. For example, the bus speed in a general-purpose Von Neumann architecture dictates how fast data can be transferred between the processor and memory and, as a result, places a limit on the computing performance (e.g., million instructions per second (MIPS), floating-point operations per second (FLOPS), etc.).

Other types of computer architecture design, such as multi-processor or parallel processor designs require complex communication, or interconnection, capabilities so that each of the different processors can communicate with other processors, with multiple memory devices, input/output (I/O) ports, etc. With today's complex processor system designs, the importance of an efficient and fast interconnection facility rises dramatically. However, such facilities are difficult to design to optimize goals of speed, flexibility and simplicity of design. Also, a uniform interconnection, or interface, is desirable to reduce the overall complexity of a system, improve programmability and to reduce design and manufacturing costs.

SUMMARY OF THE INVENTION

A computational unit, or node, in an adaptive computing engine uses a uniform interface to a network to communicate with other nodes and resources. The uniform interface is referred to as a "node wrapper." The node wrapper includes a hardware task manager (HTM), a data distributor, optional direct memory access (DMA) engine and a data aggregator.

The hardware task manager indicates when input and output buffer resources are sufficient to allow a task to execute. The HTM coordinates a nodes assigned tasks using a task lists. A "ready-to-run queue" is implemented as a first-in first-out stack. The HTM uses a top-level finite-state machine (FSM) that communicates with a number of subordinate FSMs to control individual HTM components.

The Data Distributor interfaces between the node's input pipeline register and various memories and registers within the node. Different types of data distribution are possible based upon the values in service and auxiliary fields of a 50-bit control structure. For example, look-up type memory writes can include (1) point-to-point+output port number; (2) DMA+port number, and (3) RTI+port number. For each of these types of inputs from the network, a Port/Memory Translation Table is accessed by the received port number. The accompanying received data is written into the current memory address that is retrieved from the table, and the next address is calculated and stored in the table, overwriting the current value.

The Data Aggregator arbitrates among up to four node elements that request access to the node's output pipeline register for the purpose of transferring data to the intended destination via the network.

The DMA Engine uses a five-register model. The registers include a Starting Address Register, an Address Stride Register, a Transfer Count Register, a Duty Cycle Register, and a Control Register including a GO bit, Target Node number/port number, and DONE protocol.

A control node, or "K-node," is used to control various aspects of the HTM, data distributor, data aggregator and DMA operations within the nodes of the system.

In one embodiment the invention provides data distributor in a computational unit, wherein the data distributor receives data from a network in an adaptive computing engine and distributes the data to components within the computational unit, the data distributor comprising an input mechanism for receiving the data; a distribution mechanism responsive to a control signal for distributing the data to a selected component; and a control mechanism responsive to a control signal for distributing the data to the selected component in a selected manner.

In another embodiment the invention provides a data aggregator in a computational unit in an adaptive computing engine is used to aggregate data for transfer from the computational unit to the network, wherein the computational unit includes multiple components, wherein each component can request transfer of data to the network, the data aggregator comprising an output register coupled to the network; and an arbiter mechanism for arbitrating priority of the requests from the multiple components. In another embodiment the invention provides a method for distributing data in a computational unit, the method comprising receiving data from a network in an adaptive computing engine; and distributing the data to components within the computational unit according to a control signal for distributing the data to a selected component and according to a control signal for distributing the data to the selected component in a selected manner.

In another embodiment the invention provides a method for outputting data to a network from a computational unit in an adaptive computing engine, the method comprising arbitrating among multiple components to select a component's output data to transfer to the network.

DETAILED DESCRIPTION OF THE PREFERRED EMBODIMENTS

A detailed description of an adaptive computing engine architecture used in a preferred embodiment is provided in the patents referenced above. The following section provides a summary of the architecture described in the referenced patents.

Adaptive Computing Engine

Figure 5:
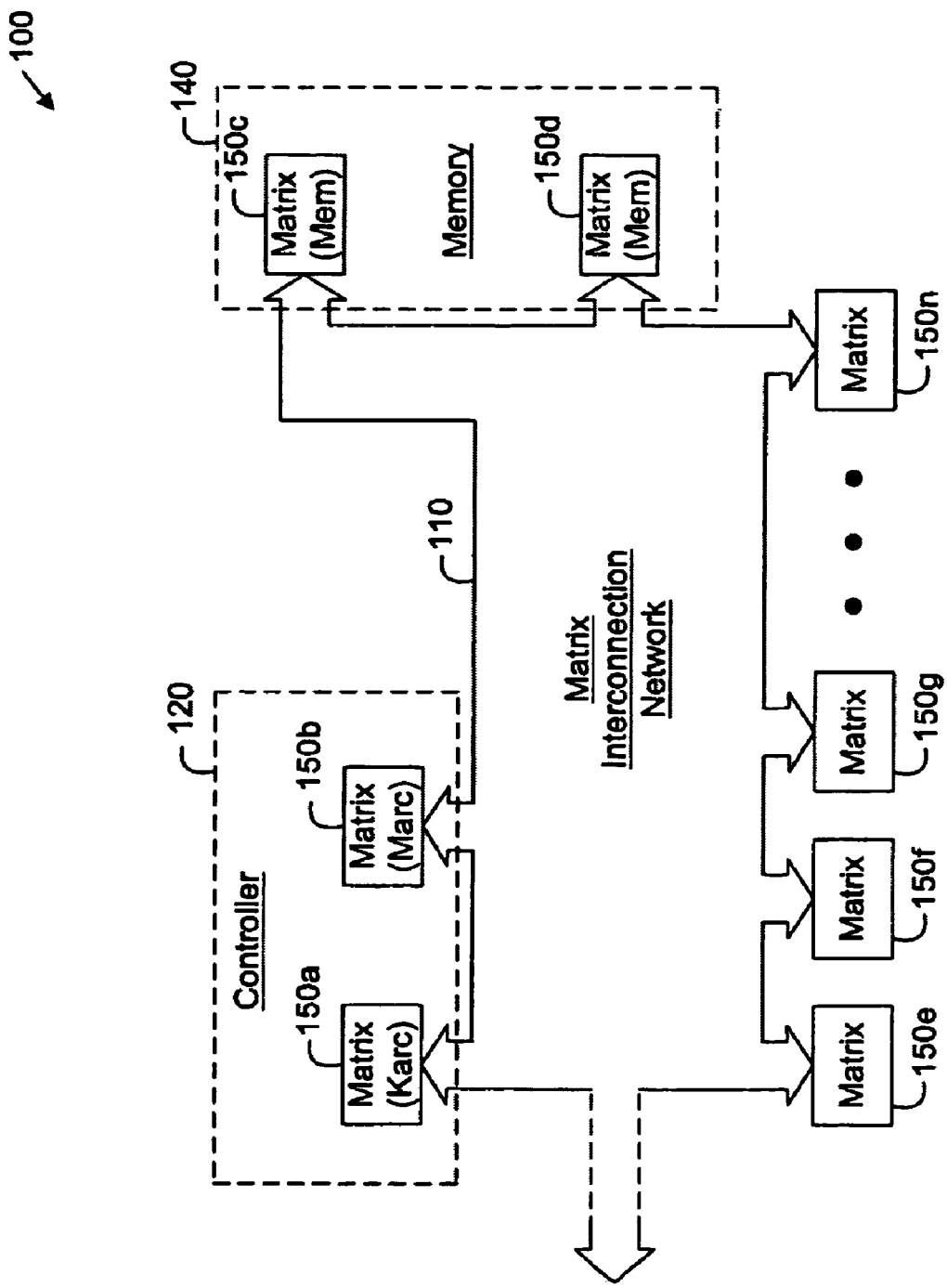
FIG. 5 shows an overview of an adaptable computing engine architecture.

FIG. 5 is a block diagram illustrating an exemplary embodiment in accordance with the present invention. Apparatus 100, referred to herein as an adaptive computing engine (ACE) 100, is preferably embodied as an integrated circuit, or as a portion of an integrated circuit having other, additional components. In the exemplary embodiment, and as discussed in greater detail below, the ACE 100 includes one or more reconfigurable matrices (or nodes) 150, such as matrices 150A through 150N as illustrated, and a matrix interconnection network 110. Also in the exemplary embodiment, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

In a preferred embodiment, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real-time, to provide any given connection between and among the reconfigurable matrices 150, including those matrices 150 configured as the controller 120 and the memory 140.

The matrices 150 configured to function as memory 140 may be implemented in any desired or exemplary way, utilizing computational elements (discussed below) of fixed memory elements, and may be included within the ACE 100 or incorporated within another IC or portion of an IC. In the exemplary embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or E2PROM. In the exemplary embodiment, the memory 140 preferably includes direct memory access (DMA) engines, not separately illustrated.

The controller 120 is preferably implemented, using matrices 150A and 150B configured as adaptive finite state machines (FSMs), as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module.

The matrix interconnection network 110 of FIG. 5, includes subset interconnection networks (not shown). These can include a boolean interconnection network, data interconnection network, and other networks or interconnection schemes collectively and generally referred to herein as "interconnect", "interconnection(s)" or "interconnection network(s)," or "networks," and may be implemented generally as known in the art, such as utilizing FPGA interconnection networks or switching fabrics, albeit in a considerably more varied fashion. In the exemplary embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below. These various interconnection networks provide selectable (or switchable) connections between and among the controller 120, the memory 140, the various matrices 150, and the computational units (or "nodes") and computational elements, providing the physical basis for the configuration and reconfiguration referred to herein, in response to and under the control of configuration signaling generally referred to herein as "configuration information", in addition, the various interconnection networks (110, 210, 240 and 220) provide selectable or switchable data, input, output, control and configuration paths, between and among the controller 120, the memory 140, the various matrices 150, and the computational units, components and elements, in lieu of any form of traditional or separate input/output busses, data busses, DMA, RAM, configuration and instruction busses.

It should be pointed out, however, that while any given switching or selecting operation of, or within, the various interconnection networks may be implemented as known in the art, the design and layout of the various interconnection networks, in accordance with the present invention, are new and novel, as discussed in greater detail below. For example, varying levels of interconnection are provided to correspond to the varying levels of the matrices, computational units, and elements. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix or computational unit, however, the interconnection network may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable nodes, or computational units; the nodes, in turn, generally contain a different or varied mix of fixed, application specific computational components and elements that may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110. Details of the ACE architecture can be found in the related patent applications, referenced above.

Uniform Interface (Node Wrapper)

Figure 1:
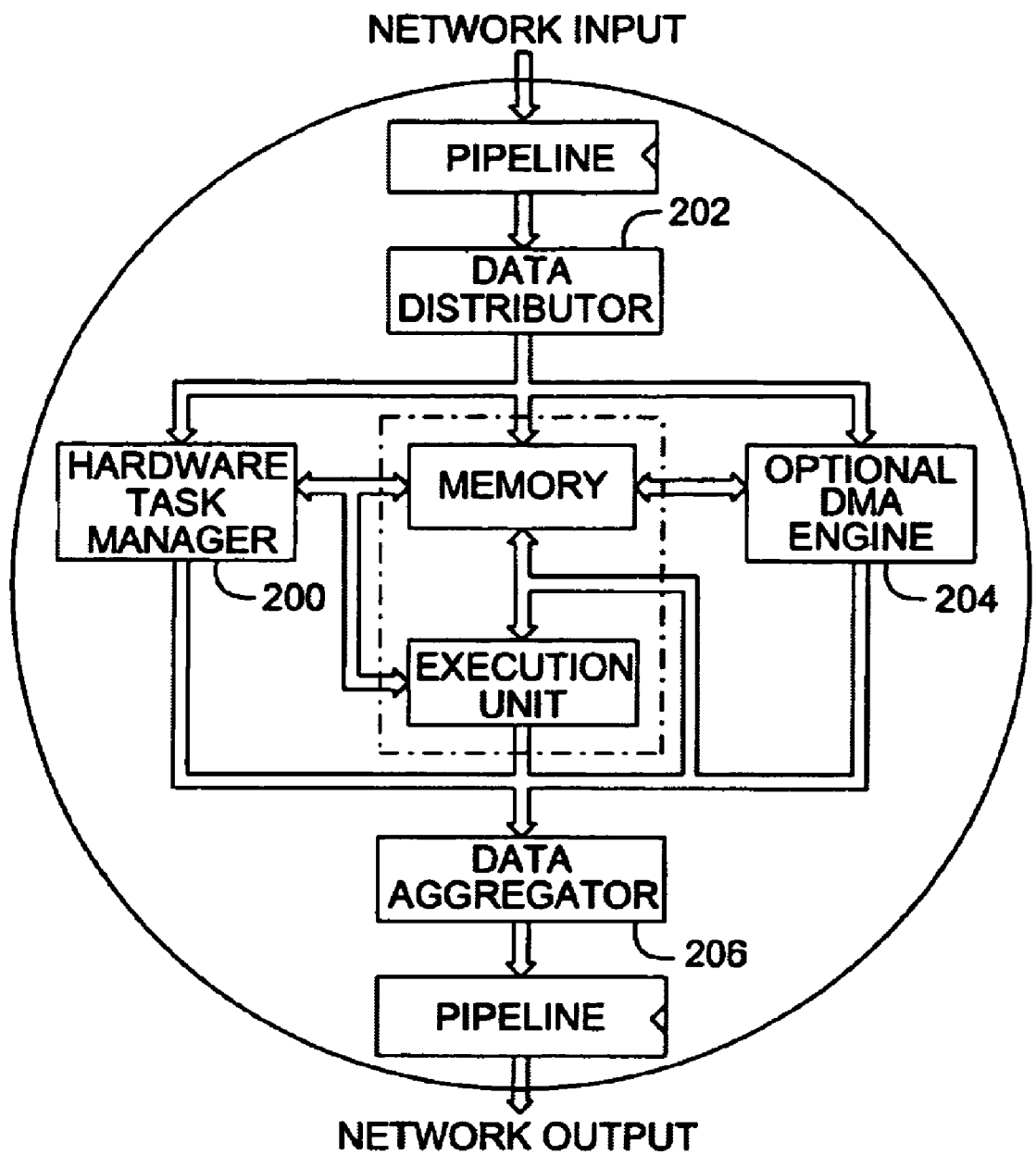
FIG. 1 illustrates the interface between heterogeneous nodes and a network.

FIG. 1 illustrates the interface between heterogeneous nodes and the homogenous network in the ACE architecture. This interface is referred to as a "node wrapper" since it is used to provide a common input and output mechanism for each node. A node's execution units and memory are interfaced with the network and with control software via the node wrapper to provide a uniform, consistent system-level programming model. Details of the node wrapper can be found in the related patent applications referenced, above.

In a preferred embodiment, each node wrapper includes a hardware task manager (HTM) 200. Node wrappers also include data distributor 202, optional direct memory access (DMA) engine 204 and data aggregator 206. The HTM coordinates execution, or use, of node processors and resources, respectively. The HTM is described in detail in the related applications referenced, above.

The Data Distributor of the Node Wrapper interfaces the node's input pipeline register to the various memories and registers within the node based upon the values in the service and auxiliary fields of the network's 50-bit data structure. No stalls are permitted at the input pipeline register. That is, the input pipeline register must accept new data from the network every clock period—the data must be consumed as it is produced.

Different types of data distribution are available. Look-up table based node memory writes can be specified as (1) point-to-point+output port number; (2) DMA+port number, and (3) RTI+port number. For each of these types of inputs from the network, the HTM's Port/Memory Translation Table (PTT) is accessed by the received port number. The accompanying received data is written into the current memory address that is retrieved from the table, and the next address is calculated and stored in the table, overwriting the current value.

Another data distribution type is a point-to-point+ack message using "producer/consumer counter acknowledgements." With this type of distribution, each received "ack message" contains a port number, a task number and an acknowledgement value. The ACK counter's table (PCT/CCT) is accessed by the received port number. The received acknowledgement value is added to the current value that is retrieved from the table, and the current value is overwritten by this new value.

If there is a change in available/unavailable status for the buffer associated with the received port number (that is, if the most significant bits of the current value and the new value are different), then the State Information Table is accessed by the received task number. The returned value for the task's Ports_counter is incremented or decremented dependent upon a status change from unavailable-to-available or available-to-unavailable, respectively. If, after its modification, the Ports_counter msb is zero, and the state of the task is "idle", then the received task number is written into the Ready-to-Run Queue (FIFO).

Figure 2:
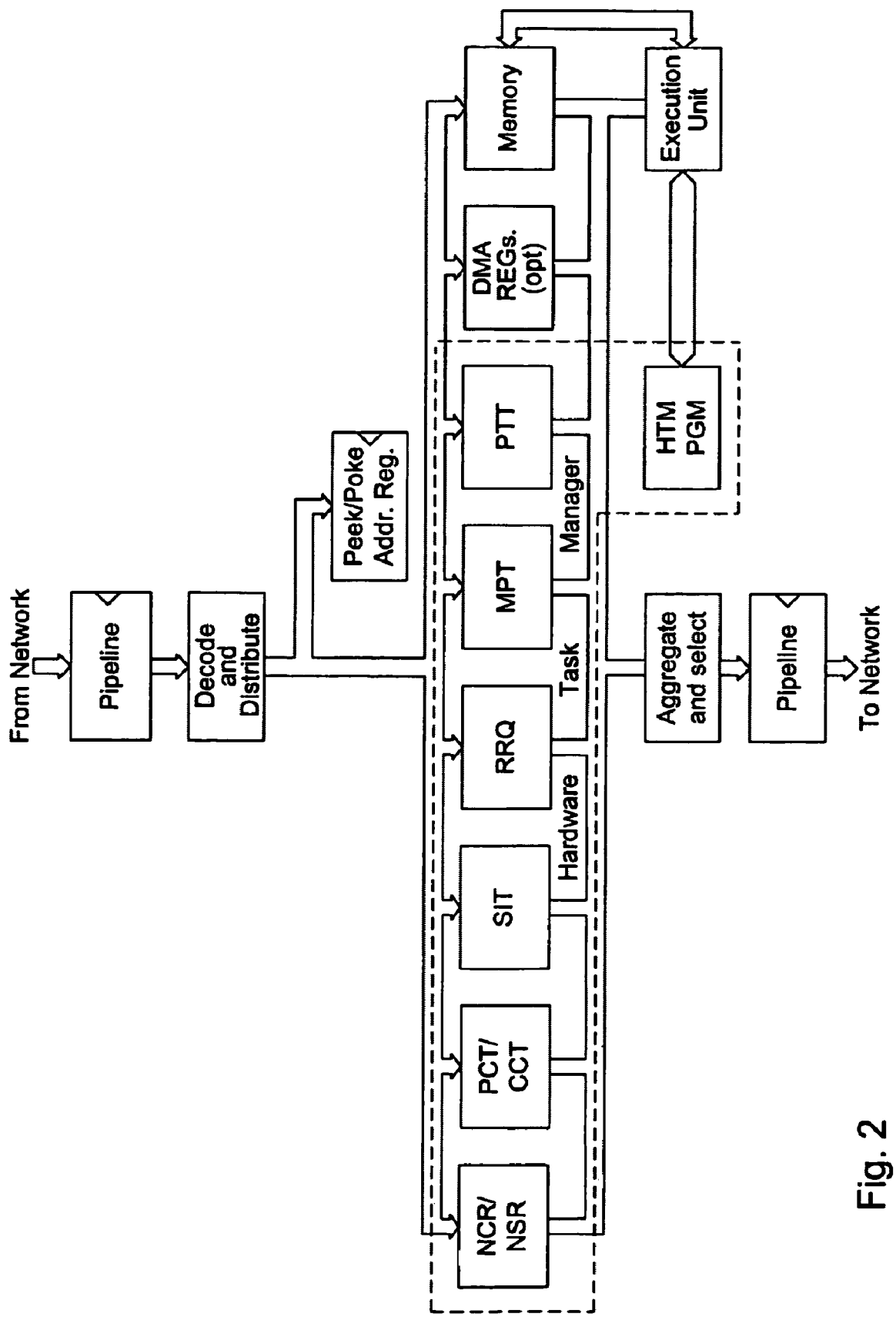
FIG. 2 is a prototype node showing possible node components.

A control node, or K-node, can store directly to an address by using a poke+address and poke+data. The K-node's Poke Address is stored in the Peek/Poke Address Register shown in FIG. 2. FIG. 2 is a prototype node intended to show possible node components. The K-node's Poke Data is written into a register/memory at the address specified by the contents of the Peek/Poke Address Register. Another form is poke+address+data where the K-node's Poke Data is written into a register/memory at the location specified by the K-node's Poke Address.

Peek+address stores the K-node's Peek Address in the Peek/Poke Address Register, and a request for K-node Peek Data is directed to the appropriate resource within the node. The data, when available, is transferred to the node's output Data Aggregator and sent to the K-node.

The Data Aggregator arbitrates among up to four node elements that request access to the node's output pipeline register for the purpose of transferring their data to the intended destination via the network. The four sources are listed below in Table I in the order (highest priority first) that the grant will be awarded to requestors.

TABLE I

Data Distributor/K-node Peek Data
Execution Unit Output Data
Source DMA Data
HTM Message Data The Data Aggregator will issue one and only one grant whenever there are one or more requests AND the node's output pipeline register is "available". The output pipeline register is "available" when it is empty or when its contents will be transferred to another register at the end of the current clock cycle.

The proposed DMA Engine follows a five-register model. The registers include a Starting Address Register, an Address Stride Register, a Transfer Count Register, a Duty Cycle Register, and a Control Register including a GO bit, Target Node number/port number, and DONE protocol. The K-node writes the registers, sets the GO bit, and receives a DONE message when the transfer has completed.

Figure 3:
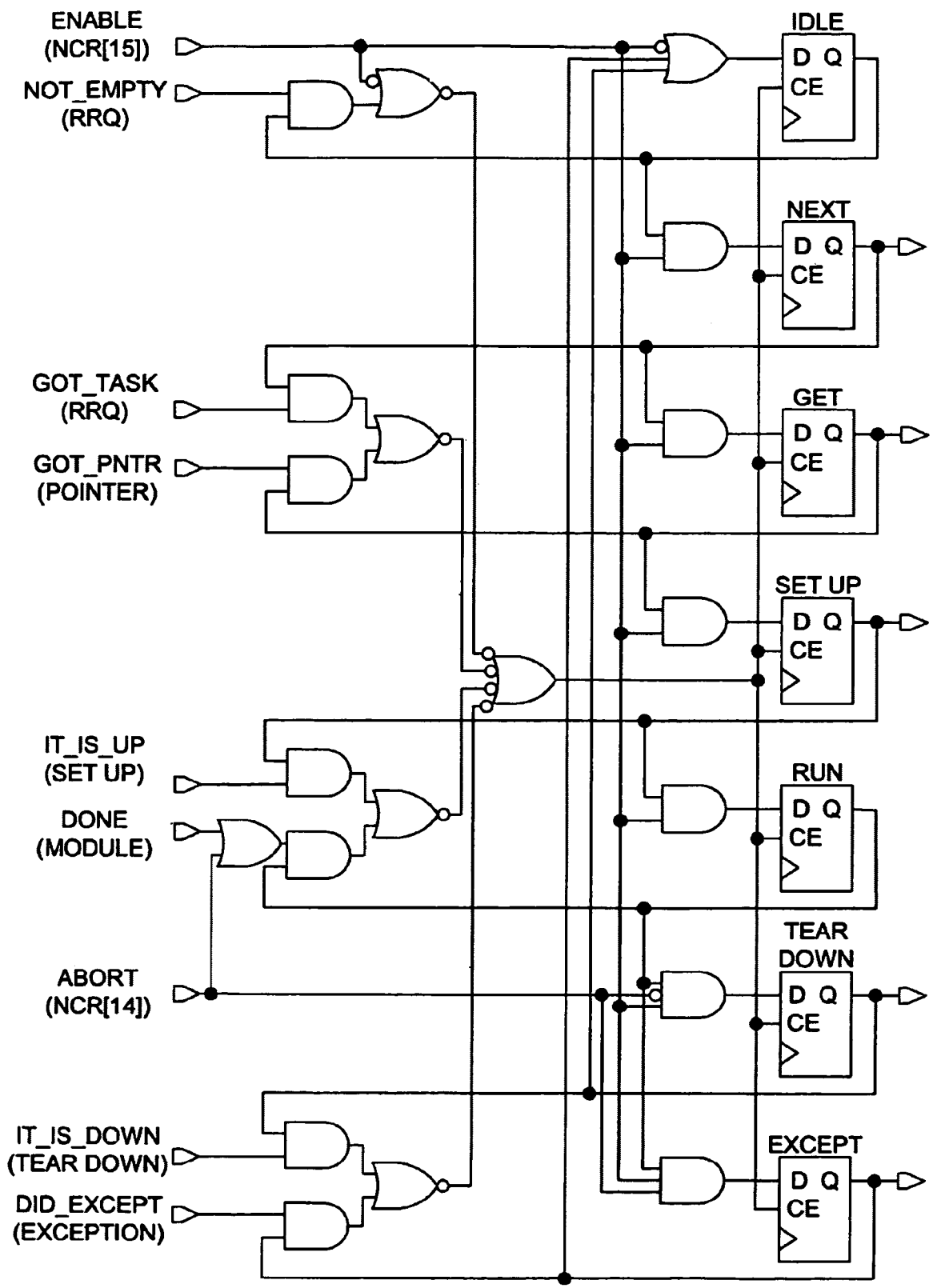
FIG. 3 shows a top level finite-state machine in a hardware task manager.

The Hardware Task Manager (HTM) processes the node's task list and produces a task's ready-to-run queue implemented as a FIFO. The HTM is configured and controlled by the K-node. The Hardware Task Manager has a top level FSM that interfaces with a number of subordinate FSMs that control the individual HTM components. A schematic of the top level FSM is shown in FIG. 3.

Figure 4:
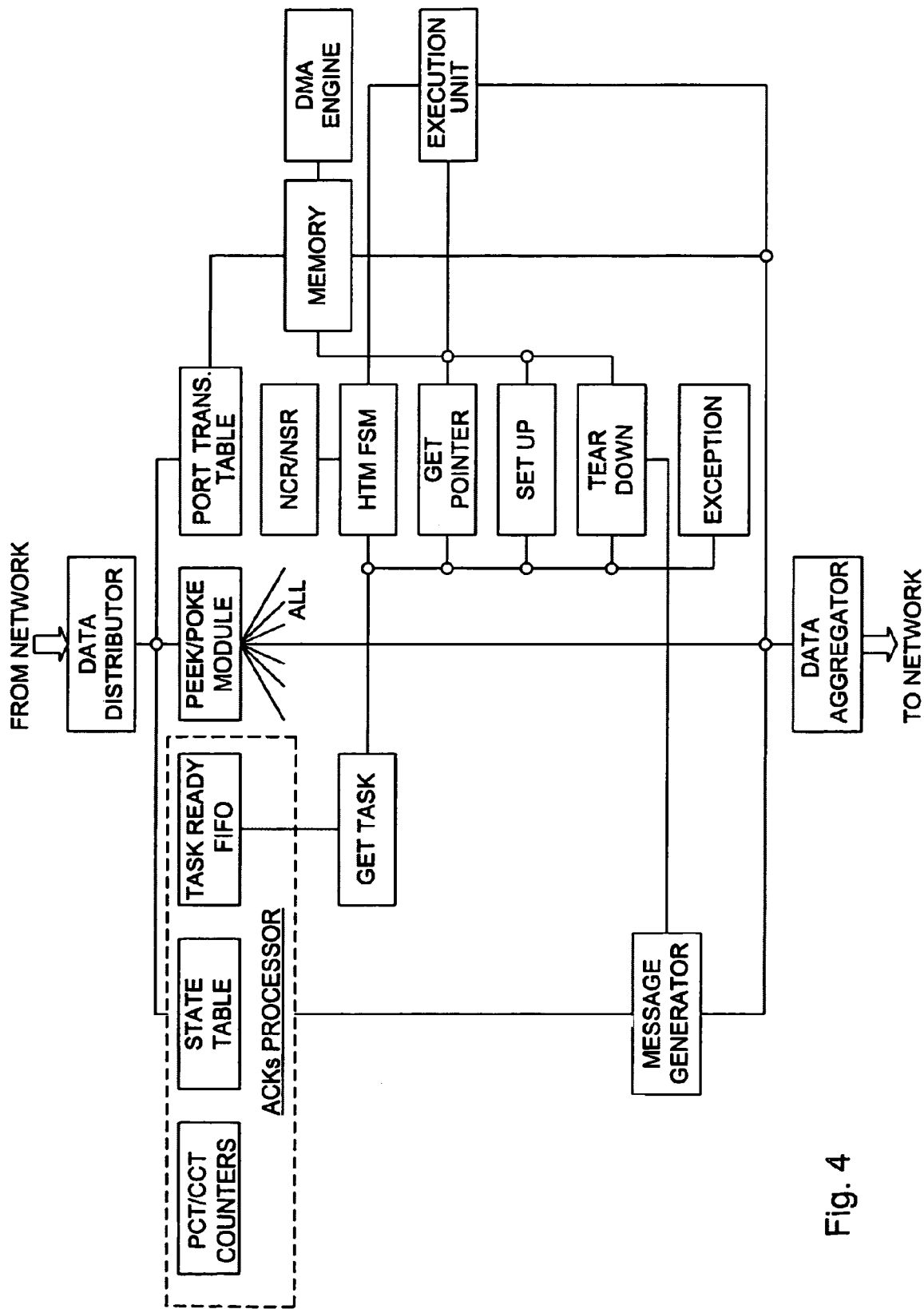
FIG. 4 shows a node functional interconnection diagram.

In a preferred embodiment, each node uses a node wrapper with common components. In other embodiments, node wrappers can vary, be of two or more categories or types, or include other design differences. The Node Wrapper interfaces to the network, the K-node control software, the node's memory and the node's execution units. Each of these interfaces is discussed, below. A node functional interconnection diagram is shown in FIG. 4.

Data from the network enters the node at its input pipeline register. The data is transferred to the node's various memories and registers based upon the values in the service and auxiliary fields of the network's 50-bit data structure. No stalls are permitted at the input pipeline register; it must accept new data from the network every clock period. That is, data must be consumed as it is produced. This imposes the requirement that any contention issues among the input pipeline register and other resources be resolved in favor of the input pipeline register.

The Data Distributor decodes the security, service, and auxiliary fields of the 50-bit network data structure to direct the received word to its intended destination. Data can be written using LUT-based Node Memory Writes: {[Point-to-point|DMA|RTI ]+port number}. For each of these types of inputs, the HTM's Port/Memory Translation Table (PTT) is accessed by the received port number. The accompanying received data is written into the current memory address that is retrieved from the table, and the next address is calculated and stored in the table, overwriting the current value.

Data can be written using K-node Memory Pokes. When it is received, The K-node's Poke Address is transferred from the input pipeline register to the Peek/Poke Address Register. When it is received, The K-node's Poke Data is written into memory at the address specified by the contents of the Peek/Poke Address Register.

ACK messages are used to coordinate task processing. Each received "ack message" contains a port number, a task number and an acknowledgement value. The ACK counters table (PCT/CCT) is accessed by the received port number. The received acknowledgement value is added to the current value retrieved from the table, and the current value is overwritten by this new value. If there is a change in available/unavailable status for the buffer associated with the received port number (that is, if the most significant bits of the current value and the new value are different), then the State Information Table is accessed by the received task number. The returned value for the task's Ports_counter is incremented or decremented dependent upon a status change from unavailable-to-available or available-to-unavailable, respectively. If, after its modification, the Ports_counter msb is zero, and the state of the task is "idle", then the received task number is written into the Ready-to-Run Queue (FIFO).

Referring to FIG. 4 on page 8, when there is contention between the Message Generator and the input pipeline register for access to the ACKs Processor, it must be resolved in favor of the latter because of the "no stall" dictum for the input pipeline register.

A poke+address command transfers the K-node's Poke Address from the input pipeline register to the Peek/Poke Address Register. A poke+data command transfers the K-node's Poke Data from the input pipeline register to the resource associated with, and at the address specified by, the contents of the Peek/Poke Address Register. A poke+address+data command transfers the K-node's Poke Address and Poke Data from the input pipeline register to the resource, indicated by the Poke Address, where the Poke Data will be written. A peek+address command transfers the K-node's Peek Address from the input pipeline register to the Peek/Poke Address Register, and a request for K-node Peek Data is directed to the appropriate resource within the node. The data, when available, is transferred to the node's output Data Aggregator, then sent to the K-node.

The node wrapper includes a node-to-network Output Pipeline Register Interface. Data from the node to the network is transferred via the node's output pipeline register, which holds data from one of the node's various memories and registers. On the network side, the transfer of data from the output pipeline register to one of four possible destinations is controlled by one of four associated arbiters.

Permission to load data into the output pipeline register is granted to one of (up to) four requesters by the Data Aggregator's arbiter. The Data Aggregator issues a grant whenever there is one or more request AND the node's output pipeline register is "available". The output pipeline register is "available" when it is empty or when its contents will be transferred to another register at the end of the current clock cycle.

The four inputs to the node output pipeline register are listed, below, in Table II, in the order (highest priority first) that multiple requestors will be granted access to the register.

TABLE II

Peek/Poke Module
Execution Unit
DMA Engine
HTM Message Generator

Whenever a K-node Peek Address arrives at the input pipeline register, it is transferred to the Peek/Poke Address Register, and a request for K-node Peek Data is directed to the appropriate resource within the node. When the data is available, a request for access to the node's output pipeline register is sent to the Data Aggregator's arbiter. When the grant is received from the arbiter, the Peek Data is transferred to the node's output pipeline register, then sent to the K-node.

Whenever an execution unit issues an instruction that generates output for a remote destination, a request for access to the node's output pipeline register is sent to the Data Aggregator's arbiter. When the arbiter grants the request, the execution unit's output data is transferred to the node's output pipeline register, then sent to the remote destination.

Whenever the DMA Engine is ready to output a data word, it requests access to the node's output pipeline register. When the grant is received, the DMA engine's data is transferred to the node's output pipeline register, then sent to the remote destination.

Whenever the HTM Message Generator creates a message for a remote recipient, it requests access to the node's output pipeline register. When the grant is received, the message is transferred to the node's output pipeline register and sent to a remote recipient. A large percentage of the messages will be HTM forward and backward buffer acknowledgement messages, but there can also be DMA Done Messages, Run Critical Task Messages, Error Messages, and others.

A Peek/Poke Module coordinates the transfer of Poke data from the K-node to a given node and the transfer of Peek data from a given node to the K-node. Since the design/debug philosophy is to the allow the K-node to write and read all registers and memories, the Peek/Poke Module includes interfaces to all other components of the node.

Whenever the Input Pipeline Register contains a K-node Peek/Poke address and/or data, the Data Distributor transfers control to the Peek/Poke Module. The Peek/Poke Module requests access to the targeted resource to store Poke data or to fetch Peek data.

Whenever the Peek/Poke Module requests access to a targeted resource to fetch Peek data and after the requested data is available, a request for access to the node's output pipeline register is sent to the Data Aggregator's arbiter. When the arbiter's grant is received, the Peek Data is transferred to the node's output pipeline register, then sent to the K-node.

The Peek/Poke Module and the Hardware Task Manager coordinate data transfers whenever the K-node Peeks or Pokes one of the components of the HTM. These components include those shown in Table III, below.

TABLE III

| Node Control Register; | NCR |
|---|---|
| Node Status Register (READ ONLY); | NSR |
| 32-entry Port/Memory Translation Table; | PTT |
| 32-entry Producers Counters Table; | PCT |
| 32-entry Consumers Counters Table; | CCT |
| 32-entry Ready-to-Run Queue; | RRQ |
| 32-entry State Information Table; | SIT |
| 32-entry Module Parameter List (MPL) Pointer Table; | MPT |

The Peek/Poke Module and the various memory controllers coordinate data transfers whenever the K-node Peeks or Pokes one of the node's memories. The Peek/Poke Module and the DMA Engine coordinate data transfers whenever the K-node Peeks or Pokes one of the DMA Engine's five registers shown in Table IV.

TABLE IV

| DMA Starting Address Register; | DSAR |
|---|---|
| DMA Address Stride Register; | DASR |
| DMA Transfer Count Register; | DTCR |
| DMA Duty Cycle Register; | DDCR |
| DMA Control and StatusRegister; | DCSR |

The hardware task manager is configured and controlled by the K-node to process the node's task list and to queue ready-to-run tasks. The hardware task manager is interfaced to all other components of the node except the DMA Engine. The Peek/Poke Module and the Hardware Task Manager coordinate data transfers whenever the K-node Peeks or Pokes an element within the HTM. K-node Poke data for the HTM is transferred to it under the control of the Peek/Poke Module. Under control of the Data Distributor, received point-to-point port-number-based memory WRITE operations require access to the hardware task manager's PTT to retrieve the current memory address where the received data will be written. Also under control of the Data Distributor, received "ack messages require access to the hardware task manager's ACK Processor, which includes the PCT/CCT Counters, State Table and Task Ready-to-Run FIFO.

Whenever the Peek/Poke Module requests access to an HTM resource to fetch Peek data, the HTM signals the Peek/Poke Module when the requested data is available. The Peek/Poke Module requests access to the output pipeline register, and when the Data Aggregator arbiter's grant is received, the HTM Peek Data is transferred to the node's output pipeline register, then sent to the K-node.

Whenever the HTM Message Generator creates a message for a remote recipient, it requests access to the node's output pipeline register. When the Data Aggregator arbiter's grant is received, the message is transferred to the node's output pipeline register, then sent to the remote recipient.

During task set up, the HTM accesses memory to fetch the pointer to the task's Module Parameter List (MPL) that allows it to retrieve MPL elements that are required for task initialization. During task tear down, the HTM stores the concluding task's address pointers and the like in its MPL.

Additionally, after the task has completed, the HTM generates ACK messages to its upstream and downstream tasks to indicate the amount of data the task has consumed and produced, respectively. To compose these messages, the HTM fetches from the MPL the required acknowledgement values, node numbers, port numbers and task numbers.

The Source DMA Engine facilitates block moves from any of the node's memories to another memory, such as on-chip bulk memory, external SDRAM memory, some other node's memory, or a K-node memory for diagnostics and/or operational purposes. The DMA Engine is controlled by the K-node.

The Peek/Poke Module and the Source DMA Engine coordinate data transfers whenever the K-node Peeks or Pokes one of the DMA Engine's five registers.

K-node Poke data for the DMA Engine is transferred to it under the control of the Peek/Poke Module.

Whenever the Peek/Poke Module requests access to one of the five DMA Engine registers, the DMA Engine signals the Peek/Poke Module when the requested data is available. The Peek/Poke Module requests access to the node's output pipeline register, and when the Data Aggregator arbiter's grant is received, the DMA Engine Peek Data is transferred to the node's output pipeline register, then sent to the K-node.

Whenever the DMA engine is ready to output a data word, it requests access to the node's output pipeline register. When the grant is received from the Data Aggregator's arbiter, the DMA engine's data, node number and port number are transferred to the node's output pipeline register, then sent to the remote destination.

The DMA Engine interfaces to each physical memory that requires DMA service. After the DMA Engine has been configured and enabled by the K-node, it will request a memory READ cycle from the memory indicated by its address generator each time its duty cycle counter reaches its terminal count, until its transfer count counter reaches its terminal count.

Although the invention has been described with respect to specific embodiments, thereof, these embodiments are merely illustrative, and not restrictive of the invention. For example, any type of processing units, functional circuitry or collection of one or more units and/or resources such as memories, I/O elements, etc., can be included in a node. A node can be a simple register, or more complex, such as a digital signal processing system. Other types of networks or interconnection schemes than those described herein can be employed. It is possible that features or aspects of the present invention can be achieved in systems other than an adaptable system, such as described herein with respect to a preferred embodiment.

Thus, the scope of the invention is to be determined solely by the appended claims.

What is claimed is:

1. A data distributor in a computational unit of an integrated circuit, wherein the data distributor receives data from a network and distributes the data to a plurality of components within the computational unit, the data distributor comprising an input mechanism for receiving the data from the network at the data distributor in the computational unit;

a distribution mechanism responsive to a control signal for distributing the data to a selected component of the plurality of components, wherein the data is distributed as it is received from the network; and a control mechanism responsive to a control signal for distributing the data to the selected component using a selected data distribution type of a plurality of data distribution types, the plurality of data distribution types comprising a look-up table-based memory write and a point-to-point distribution with acknowledgement.

2. The data distributor of claim 1, wherein the selected component includes a register configured to store the distributed data.

3. The data distributor of claim 1, wherein the selected component includes a memory configured to store the distributed data.

4. The data distributor of claim 1, wherein any contentions between the input mechanism and the selected component are resolved in favor of the input mechanism.

5. The data distributor of claim 1, wherein the selected data distribution type further comprises using an output port number to distribute the data.

6. The data distributor of claim 1, wherein the selected data distribution type further comprises using a direct-memory address transfer to distribute the data.

7. The data distributor of claim 1, wherein the selected data distribution type further comprises using an interrupt to distribute the data.

8. The data distributor of claim 1, wherein the input mechanism includes a pipeline register.

9. The data distribution of claim 1, further comprising an output register coupled to the network; and an arbiter mechanism for arbitrating priority of the requests from the plurality of components.

10. The data distributor of claim 9, wherein the plurality of components comprises a Peek/Poke Module.

11. The data distributor of claim 9, wherein the plurality of components comprise an Execution Unit.

12. The data distributor of claim 9, wherein the plurality of components comprise a DMA Engine.

13. The data distributor of claim 9, wherein the plurality of components comprise a Hardware Task Manager Message Generator.

14. The data distributor of claim 1, wherein data is received from a plurality of reconfigurable nodes, and wherein the data distributor is configured to distribute the data from the reconfigurable nodes based on information in the data.

15. A method for distributing data in a computational unit of an integrated circuit, the method comprising
receiving data from a network couplable to the integrated circuit;
selecting a data distribution type of a plurality of data distribution types, the plurality of data distribution types comprising a look-up table-based memory write and a point-to-point distribution with acknowledgement; and
distributing the data to a selected component of a plurality of components within the computational unit according to a control signal for distributing the data to the selected component and according to a control signal for distributing the data using the selected data distribution type.

16. The method of claim 15, wherein the selected component includes a register.

17. The method of claim 15, wherein the selected component includes a memory.

18. The method of claim 15, wherein the selected data distribution type further comprises using an output port number to distribute the data.

19. The method of claim 15, wherein the selected data distribution type further comprises using a direct-memory address transfer to distribute the data.

20. The method of claim 15, wherein the selected data distribution type further comprises using an interrupt to distribute the data.

21. The method of claim 15, wherein the data is received by an input mechanism comprising a pipeline register.

22. The method of claim 15, further comprising:
arbitrating among the plurality of components to select output data to transfer to the network; and
outputting the selected data to the network.

23. The method of claim 22, further comprising sending data to an output register coupled to the network; and prioritizing requests from the plurality of components.

24. The method of claim 22, wherein one of the plurality of components comprise a Peek/Poke Module.

25. The method of claim 22, wherein one of the plurality of components compromise an Execution Unit.

26. The method of claim 22, wherein one of the plurality of components comprise a DMA Engine.

27. The method of claim 22, wherein one of the plurality of components comprise a Hardware Task Manager Message Generator.

28. The method of claim 15, wherein any contentions between the input mechanism and the selected component are resolved in favor of the input mechanism.

29. The method of claim 15, wherein data is received from a plurality of reconfigurable nodes, wherein the data distributor is configured to distribute the data from the reconfigurable nodes based on information in the data.

* * * * *

UNITED STATES PATENT AND TRADEMARK OFFICE
CERTIFICATE OF CORRECTION

PATENT NO. : 7,225,279 B2
APPLICATION NO. : 10/443554
DATED : May 29, 2007
INVENTOR(S) : Scheuermann et al.

It is certified that error appears in the above-identified patent and that said Letters Patent is hereby corrected as shown below:

In column 11, line 28, please replace "The data distribution of claim 1, further comprising an output register coupled to the network; and an arbiter mechanism for arbitrating priority of the requests from the plurality of components.", with --The data distribution of claim 1, further comprising an output register coupled to the network; and an arbiter mechanism for arbitrating priority of the requests from the plurality of components.--

Signed and Sealed this

Fifteenth Day of April, 2008

JON W. DUDAS
*Director of the United States Patent and Trademark Office*